United States Patent [19]
Foster

[11] 3,857,585
[45] Dec. 31, 1974

[54] SUPPORT STAND FOR A RACER-TYPE BICYCLE

[76] Inventor: Edwin E. Foster, 1801 Camp Craft Rd., Austin, Tex. 78767

[22] Filed: Oct. 3, 1973

[21] Appl. No.: 403,168

[52] U.S. Cl................. 280/294, 74/594.4, 74/594.6
[51] Int. Cl............................................. B62h 1/04
[58] Field of Search............ 74/594.4, 594.5, 594.6; 280/294

[56] References Cited
UNITED STATES PATENTS

| | | | |
|---|---|---|---|
| 626,694 | 6/1899 | Hart, Jr. | 280/294 |
| 634,297 | 10/1899 | Hart, Jr. | 280/294 |
| 640,904 | 1/1900 | Hart, Jr. | 280/294 |

Primary Examiner—Samuel Scott
Assistant Examiner—F. D. Shoemaker
Attorney, Agent, or Firm—Ralph W. Kalish

[57] ABSTRACT

A support stand for racer-type bicycles, which latter include a perforated outer side plate; the stand having an upper portion engaged as by a bolt received within a perforation in the last mentioned side plate; the stand having a slightly horizontal portion adjacent the aforesaid side plate and being formed to provide a pair of legs extending divergingly downwardly and outwardly from said horizontal portion; which legs are interconnected by a base element. The stand is located eccentrically with respect to the axis of rotation of the pedal so that upon removal of the operator's foot from the pedal it will be urged downwardly and rearwardly to present the stand in support attitude.

6 Claims, 6 Drawing Figures

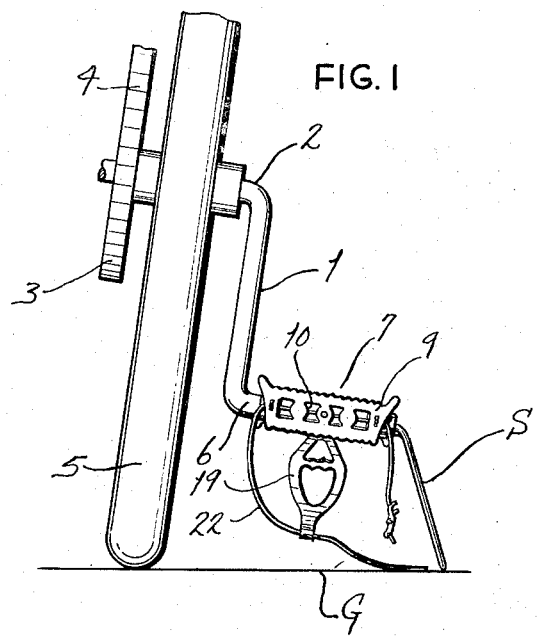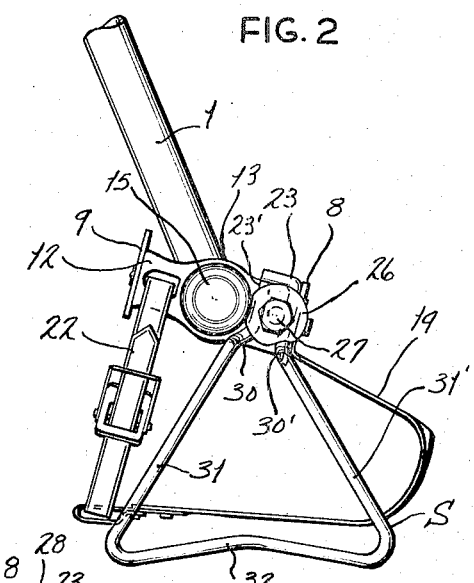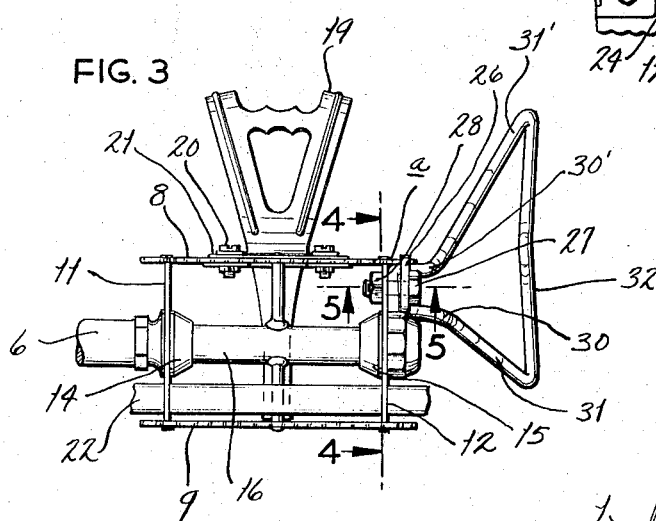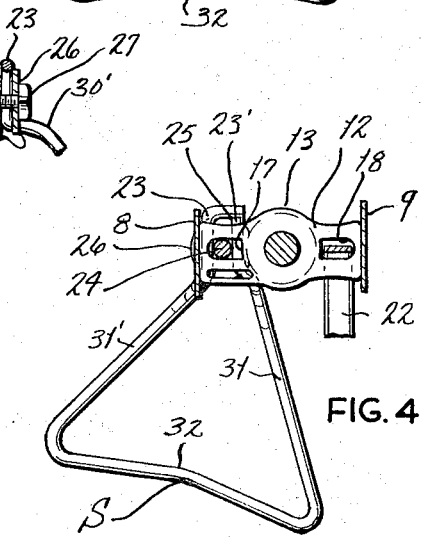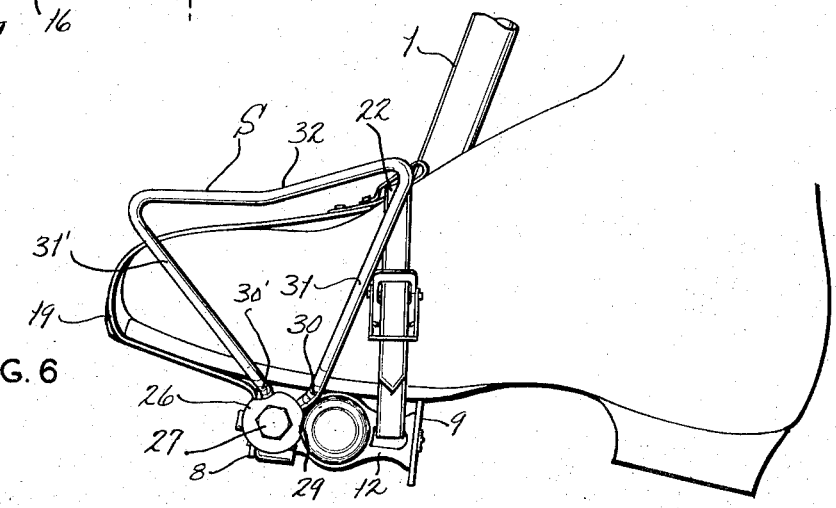

3,857,585

SUPPORT STAND FOR A RACER-TYPE BICYCLE

BACKGROUND AND SUMMARY OF THE INVENTION

This invention relates in general to bicycles and, more particularly, to a support stand for a racer-type bicycle.

The invention herein is immediately related to my invention in bicycle support stands as set forth in my co-pending patent application Ser. No. 335,699 filed Feb. 26, 1973. But, as will be shown hereinbelow, it is distinguished thereover by reason of the peculiar adaptation of such stand for mounting upon pedals of the character used in bicycles customarily referred to as "racers."

Therefore, it is an object of the present invention to provide a support stand for mounting upon the pedal of racer-type bicycles and which stand does not necessitate operation by the rider for disposition into either operative or inoperative position as the same automatically moves between said positions consequent to the use or disuse of the associated pedal.

It is another object of the present invention to provide a support stand of the character stated which is of unitary construction having no movable parts so that same is resistant to breakdown and does not require periodic lubrication as is the case with current stands such as the "kick" type.

It is a further object of the present invention to provide a support stand of the character stated which although secured upon a pedal of a racer-type bicycle provides no obstacle for the usual operation of such pedal, including access of the foot thereto and facile removal of the foot therefrom.

It is still a further object of the present invention to provide a support stand of the character stated which is adapted for ready application upon existing racer bicycles without requiring modification thereof; and which is of light weight.

It is another object of the present invention to provide a support stand of the type stated which may be most economically manufactured; which may be made from a multiplicity of suitable materials such as metal, plastic and the like, the requirement being that it maintain its rigidity; which is reliable in usage; and the use of which permits a stable support of the bicycle regardless of the nature of the particular terrain or of the supporting surface.

BRIEF DESCRIPTION OF THE DRAWINGS

FIG. 1 is an elevational view of a portion of a racer-type bicycle having a support stand mounted thereon which is constructed in accordance with and embodying the present invention; said stand being illustrated in operative position with respect to a support surface.

FIG. 2 is an end view taken on the right-hand side of FIG. 1.

FIG. 3 is a top plan view of the support stand as illustrated in FIG. 1.

FIG. 4 is a vertical transverse sectional view taken on the line 4—4 of FIG. 3.

FIG. 5 is a vertical transverse sectional view taken on the line 5—5 of FIG. 3.

FIG. 6 is an end view taken substantially on the right-hand side of FIG. 1 but illustrating the stand in inoperative position with the associated pedal being disposed for cycling.

DESCRIPTION OF THE PREFERRED EMBODIMENT

Referring now by reference numerals to the drawing which illustrates the preferred embodiment of the present invention; 1 designates a crank formed with a customary crank axle 2 of a racer-type bicycle which axle 2 is engaged to the usual driven sprocket 3 connected by a chain 4 to a driven sprocket (not shown) upon the rear wheel (not shown) of the bicycle. The front wheel of the bicycle is indicated fragmentarily by the reference numeral 5. It is recognized that a crank 1 is provided at both ends of crank axle 2 with each having a crank arm 6 at its lower end; the same being sometimes referred to as a pedal axle. Mounted upon each crank 1 is a foot pedal broadly indicated 7 which is of the construction presently peculiar to racer-type bicycles and embody normally front and rearward, planar parallel narrow plates 8, 9 respectively, each of which are provided with a plurality of openings, as indicated at 10, for both weight reduction as well as for promoting securement to accessories as will be shown. Interconnecting said front and rear plates 8 and 9 are narrow inner and outer side plates 11, 12 which are also in planar parallel position and with means of connection to front and rear plates 8, 9 being in any suitable manner such as, for example, by interlocking tabs. Front and rear plates 8, 9 project at their ends laterally beyond side plates 11, 13 thereby presenting short extensions indicated at a. Each side plate 11, 12 is laterally provided with an enlarged portion shown at 13 having an opening (not shown) for receiving the appropriate fittings as shown at 14, 15 for securing a tubular casing 16 in position through which latter extends the related crank arm 6.

Said casing 16 is axially parallel to the planes of front and rear plates 8, 9 and is equidistant therefrom. On either side of enlarged portions 13 side plates 11, 12 are each provided with apertures 17, 18 which also conduce to weight reduction as well as providing ready points of attachment of accessories. Apertures 18 are at the rearward end portion of the respective plates 11, 12 as the same are considered from cycling disposition of the associated pedal 7.

Pedal 7 is provided with a toe clip 19 which has become customary with racer-type bicycles, the same having its normally lower end secured to front plate 8 as by short bolts 20 extending through apertures in a mounting flange 21 aligned with openings 10 in said front plate 8. The other or upper end of toe clip 19 is engaged to a strap 22, which is adapted to surround the front portion of the cyclist's foot for inhibiting displacement during operation; said strap having a portion which extends transversely of the normally underside of pedal 7 and which is threaded through apertures 18 of said side plates 11, 12. The foregoing sets forth the conventional racer-type bicycle pedal which per se does not form a part of the present invention.

A support stand S is provided for affixation upon either pedal 7 of the bicycle. However, in view of the fact that most riders mount upon, and dismount from, a bicycle on the left side thereof, stand S is shown and described herein in association with the pedal 7 on the left-hand side of the bicycle. Stand S is fabricated, preferably, from a single continuous length of rod stock of suitable diameter as, for instance, in the range of one-eighth to one-fourth inch. The opposite end portions 23, 23' of stand S are brought into immediate mutual proximity for presentation against the outwardly directed face of side plate 12 and between the adjacent extension a of front plate 8 and casing fitting 15 for disposition about the stem of a bolt 24 at the inner end portion of which passes through aperture 17 of outer side plate 12. The opposite end portions 23, 23' of stand S are mutually secured as by brazing, welding, or the like, such being shown at 25 in FIG. 4. Immediately outwardly of said end portions 23, 23' of stand S, bolt 24 carries an enlarged, flat metallic washer 26, which on its outer face abuts against the inner face of the head 27 of bolt 24; which latter has threadedly engaged upon its inner end a nut 28 which abuts against the inner face of side plate 12. Thus upon tightening of bolt 24 the end portions 23, 23' of stand S are tightly sandwiched between side plate 12 and washer 26, thereby retaining stand S in proper relative position and with any undesired rotation being denied by reason of the wedging of end portions 23, 23' within the spacing provided. Washer 26 is peripherally contoured to present certain edge-cut-out portions as at 29 for accepting a peripheral arcuate portion of fitting 15 thereby locking said washer 26 against rotation.

Immediately outwardly of end portions 23, 23' stand S is bent slightly horizontally as at 30, 30' from which the same presents a pair of downwardly and outwardly diverging legs 31, 31' which may be referred to as forward and rearward, respectively, in considering stand S in its bicycle-supporting condition. At their lower ends, legs 31, 31' are interconnected by a base section 32 which may be of slightly inverted V-configuration. As viewed from the righthand side of FIG. 1, as shown in FIG. 2, stand S is basically of a triangular configuration.

However, legs 31, 31' are not of the same exact length nor necessarily from the same angle, that is to the same degree, at their lower ends with the adjacent portions of base 32. This slight differential results from the fact that when in disuse pedal 7, through gravity, will tend to cant downwardly at its end carrying stand S. This is quite manifest when one would consider that the center of gravity would normally be on a line passing vertically through the axis of casing 16 or of the crank arm 6 therein, were there no accessories or the like mounted upon said pedal 7. In the present instance the stand S, being located to one side of the axis of crank arm 6, would in and of itself cause a shifting of the center of gravity which is further enhanced by virtue of the major portion of toe clip 19 being to the same size of said axis. Thus the aforesaid differential in legs 31, 31' merely serves to compensate so that base portion 32 will, in its end portions, rest firmly upon the support surface, such as the ground G.

From the foregoing the operation of support stand should be apparent. By reason of the substantial horizontality at 30, 30', together with the outward inclination of legs 31, 31', support stand S is presented sufficiently laterally of pedal 7 so that the bicycle operator's foot may be freely placed on pedal 7 with the forward portion received within toe clip 19 without interference or obstruction and with removal of the foot being as easily achieved. With the operator's foot upon pedal 7 stand S is automatically brought into rest or inoperative position fully removed from any inadvertent engagement with the support surface (see FIG. 6). When the user removes his foot from pedal 7, then the same, through gravity, will be swung about its axis causing the erstwhile forward portion of said pedal to move downwardly and rearwardly thereby presenting stand S for support disposition. It will thus be seen that stand S serves as a counterweight for appropriately driving pedal 7 downwardly to assure that the same will automatically be brought into support attitude, without any effort on the part of the operator.

As is evident from FIG. 1, support stand S is of a heighth which is less than the distance between pedal 7 and support surface when the bicycle is in upright position so that in order to utilize stand S the operator must tilt the bicycle to the requisite degree until base 32 is in contact with the support surface. The outward inclination of stand S reduces the degree of tilt required for disposing the bicycle in a position of rest, as well as enhancing stability.

When the user desires to operate the bicycle, he need merely tilt same to vertical position, thereby removing stand S from surface-engagement and then by obvious manipulation of the foot, rock pedal 7 into foot-receiving position.

From the foregoing it is evident that support stand S may be economically manufactured and easily secured upon existing racer bicycle pedal constructions. Being devoid of any moving parts, stand S is resistant to breakdown, being reliable and durable in use; and foremost, does not necessitate any action on the part of the rider for presenting same in supporting position or in returning same therefrom.

Although stand S is disclosed herein as being of rod stock, such is not to preclude utilization of plate or other configurations. The rodding is shown as it is especially suitable.

Having thus described my invention, what I claim and desire to obtain Letters Patent for is:

1. The combination with a racer-type bicycle pedal having normally front and rear parallel end plates, inner and outer parallel side plates, means interengaging said end plates and said side plates, a pedal axle extending transversely of said pedal in axially parallel relationship to said front and rear end plates, means rendering said pedal rotatable upon said pedal axle of a bicycle support stand, having a body with a normally upper portion presented to the outer face of said outer side plate between said normally front plate and said pedal axle, means engaging said body upper portion to said outer side plate, said stand body including a horizontal portion proximate its upper end for displacing said body laterally outwardly of said outer side plate, said body having forwardly and rearwardly projecting side portions, and a base portion, the distance between said body upper portion and said base portion being less than the distance between said pedal and the ground support surface when said pedal is in operative condition.

2. The combination as defined in claim 1 and further characterized by said outer side plate having an opening between said pedal axle and the normally front plate, said means engaging said stand body upper portion being fastener means provided in said opening, the normally upper portion of said body being engaged to said fastener means.

3. The combination as defined in claim 2 and further characterized by said fastener means being a threaded member, the normally upper portion of said body having an opening for disposition about said threaded member, and locking means engaged upon said threaded member to prevent displacement of said support stand upper end.

4. The combination as defined in claim 3 and further characterized by said means interengaging said end plates and said side plates being located spacedly from the end extremities of said end plates to provide lateral extensions, a cap-forming member mounted on said outer side plate for receiving the proximate end of said pedal axle, a detent engaged upon said threaded member and engaging said cap-forming member and the proximate lateral extension of said front plate for inhibiting displacement of said body upper portion from said threaded member.

5. The combination as defined in claim 4 and further characterized by said support stand being formed of length of rod stock, said upper end portion comprising the meeting of the end extremities of said rod stock, said end extremity portions of said rod stock being formed for disposition about said threaded member between said cap-forming member and the adjacent lateral extension of said front plate.

6. The combination as defined in claim 5 and further characterized by means rigidly connecting the end extremity portions of said rod stock.

* * * * *